(12) United States Patent
Zhu et al.

(10) Patent No.: US 11,260,849 B2
(45) Date of Patent: Mar. 1, 2022

(54) METHOD FOR DETERMINING LANE CHANGING TRAJECTORIES FOR AUTONOMOUS DRIVING VEHICLES

(71) Applicant: Baidu USA LLC, Sunnyvale, CA (US)

(72) Inventors: Fan Zhu, Sunnyvale, CA (US); Qi Kong, Sunnyvale, CA (US)

(73) Assignee: BAIDU USA LLC, Sunnyvale, CA (US)

( * ) Notice: Subject to any disclaimer, the term of this patent is extended or adjusted under 35 U.S.C. 154(b) by 109 days.

(21) Appl. No.: 15/987,872

(22) Filed: May 23, 2018

(65) Prior Publication Data
US 2019/0359202 A1 Nov. 28, 2019

(51) Int. Cl.
*B60W 30/00* (2006.01)
*B60W 10/18* (2012.01)
(Continued)

(52) U.S. Cl.
CPC ............ *B60W 30/00* (2013.01); *B60W 10/04* (2013.01); *B60W 10/18* (2013.01); *B60W 10/20* (2013.01); *B60W 40/04* (2013.01); *B60W 40/105* (2013.01); *G05D 1/0088* (2013.01); *G05D 1/0221* (2013.01); *G05D 1/0223* (2013.01); *G05D 1/0242* (2013.01); *G05D 1/0246* (2013.01); *G05D 1/0255* (2013.01); *G05D 1/0257* (2013.01); *G05D 1/0278* (2013.01); *B60W 2420/40* (2013.01); *B60W 2420/42* (2013.01); *B60W 2420/52* (2013.01); *B60W 2420/54* (2013.01); *B60W 2520/10* (2013.01); *B60W 2554/80* (2020.02);
(Continued)

(58) Field of Classification Search
CPC .............................. B60W 30/00; B60W 10/04
See application file for complete search history.

(56) References Cited

U.S. PATENT DOCUMENTS

| | | | |
|---|---|---|---|
| 6,580,385 B1 * | 6/2003 | Winner | G01S 13/865 342/70 |
| 2005/0131646 A1 * | 6/2005 | Camus | G01S 3/7864 701/301 |

(Continued)

FOREIGN PATENT DOCUMENTS

| | | |
|---|---|---|
| CN | 102548832 A | 7/2012 |
| CN | 106809215 A | 6/2017 |

(Continued)

*Primary Examiner* — Jess Whittington
(74) *Attorney, Agent, or Firm* — Womble Bond Dickinson (US) LLP

(57) ABSTRACT

In one embodiment, during a planning stage of autonomous driving of an autonomous driving vehicle (ADV), it is determined that the ADV needs to change lanes from a source lane to a target lane. A first trajectory is generated from a current location of the ADV in the source lane to the target lane such as a center line of the target lane. A lane shifting correction is then calculated based on the lane configuration of at least the source lane and/or target lane, as well as the current state of the ADV. Based on the lane shifting correction, at least the starting point of the first trajectory is modified, which in turn generates a second trajectory. In one embodiment, the starting point of the first trajectory is shifted laterally with respect to a heading direction of the source lane based on the lane shifting correction.

19 Claims, 10 Drawing Sheets

(51) Int. Cl.
  *B60W 10/20*   (2006.01)
  *B60W 40/04*   (2006.01)
  *B60W 40/105*  (2012.01)
  *G05D 1/00*    (2006.01)
  *G05D 1/02*    (2020.01)
  *B60W 10/04*   (2006.01)

(52) U.S. Cl.
  CPC ..... *B60W 2556/00* (2020.02); *B60W 2556/45* (2020.02); *B60W 2710/0605* (2013.01); *B60W 2710/18* (2013.01); *B60W 2710/20* (2013.01); *G05D 2201/0212* (2013.01)

(56) References Cited

U.S. PATENT DOCUMENTS

| | | | | |
|---|---|---|---|---|
| 2007/0205938 A1* | 9/2007 | Zimmermann | ......... | G01S 13/87 342/69 |
| 2012/0089299 A1* | 4/2012 | Breed | ............... | B60N 2/888 701/36 |
| 2014/0229068 A1* | 8/2014 | Ueyama | ............. | B62D 6/002 701/41 |
| 2015/0234045 A1* | 8/2015 | Rosenblum | ........... | G01S 13/86 342/71 |
| 2015/0288948 A1* | 10/2015 | Schamp | ............. | H04N 5/33 348/47 |
| 2015/0294430 A1* | 10/2015 | Huang | ................ | B60W 10/18 705/7.24 |
| 2015/0294566 A1* | 10/2015 | Huang | ................ | G08G 1/133 701/41 |
| 2016/0090087 A1* | 3/2016 | Lee | ............... | B60W 30/0953 701/93 |
| 2016/0327636 A1* | 11/2016 | Gazit | ................. | G01S 7/4972 |
| 2017/0061799 A1* | 3/2017 | Fujii | ................. | B60W 30/12 |
| 2017/0151982 A1* | 6/2017 | Fujii | ................. | G06K 9/6267 |
| 2017/0336515 A1 | 11/2017 | Hosoya et al. | | |
| 2017/0337810 A1* | 11/2017 | Abe | ................ | G01C 21/3492 |
| 2018/0164827 A1* | 6/2018 | Chu | ................ | G05D 1/0248 |
| 2019/0171206 A1* | 6/2019 | Abrams | ........... | G01C 21/3658 |
| 2019/0206255 A1* | 7/2019 | Tao | ................ | H04W 4/46 |
| 2019/0212749 A1* | 7/2019 | Chen | ............. | B60W 30/18154 |

FOREIGN PATENT DOCUMENTS

| | | |
|---|---|---|
| CN | 107450530 A | 12/2017 |
| CN | 108027243 A | 5/2018 |
| JP | 2014151758 | 8/2014 |
| JP | 2017056779 | 3/2017 |

* cited by examiner

METHOD FOR DETERMINING LANE CHANGING TRAJECTORIES FOR AUTONOMOUS DRIVING VEHICLES

TECHNICAL FIELD

Embodiments of the present disclosure relate generally to operating autonomous vehicles. More particularly, embodiments of the disclosure relate to planning lane changing trajectories of autonomous driving vehicles.

BACKGROUND

Vehicles operating in an autonomous mode (e.g., driverless) can relieve occupants, especially the driver, from some driving-related responsibilities. When operating in an autonomous mode, the vehicle can navigate to various locations using onboard sensors, allowing the vehicle to travel with minimal human interaction or in some cases without any passengers.

One of the autonomous driving scenarios is lane changing. Changing lane is always a challenging operation of autonomous driving. How to plan a smooth trajectory that guides an autonomous driving vehicle is a challenging problem. There has been a lack of efficient ways to change lanes in a short time without significant overshot.

BRIEF DESCRIPTION OF THE DRAWINGS

Embodiments of the disclosure are illustrated by way of example and not limitation in the figures of the accompanying drawings in which like references indicate similar elements.

DETAILED DESCRIPTION

Figure 1:
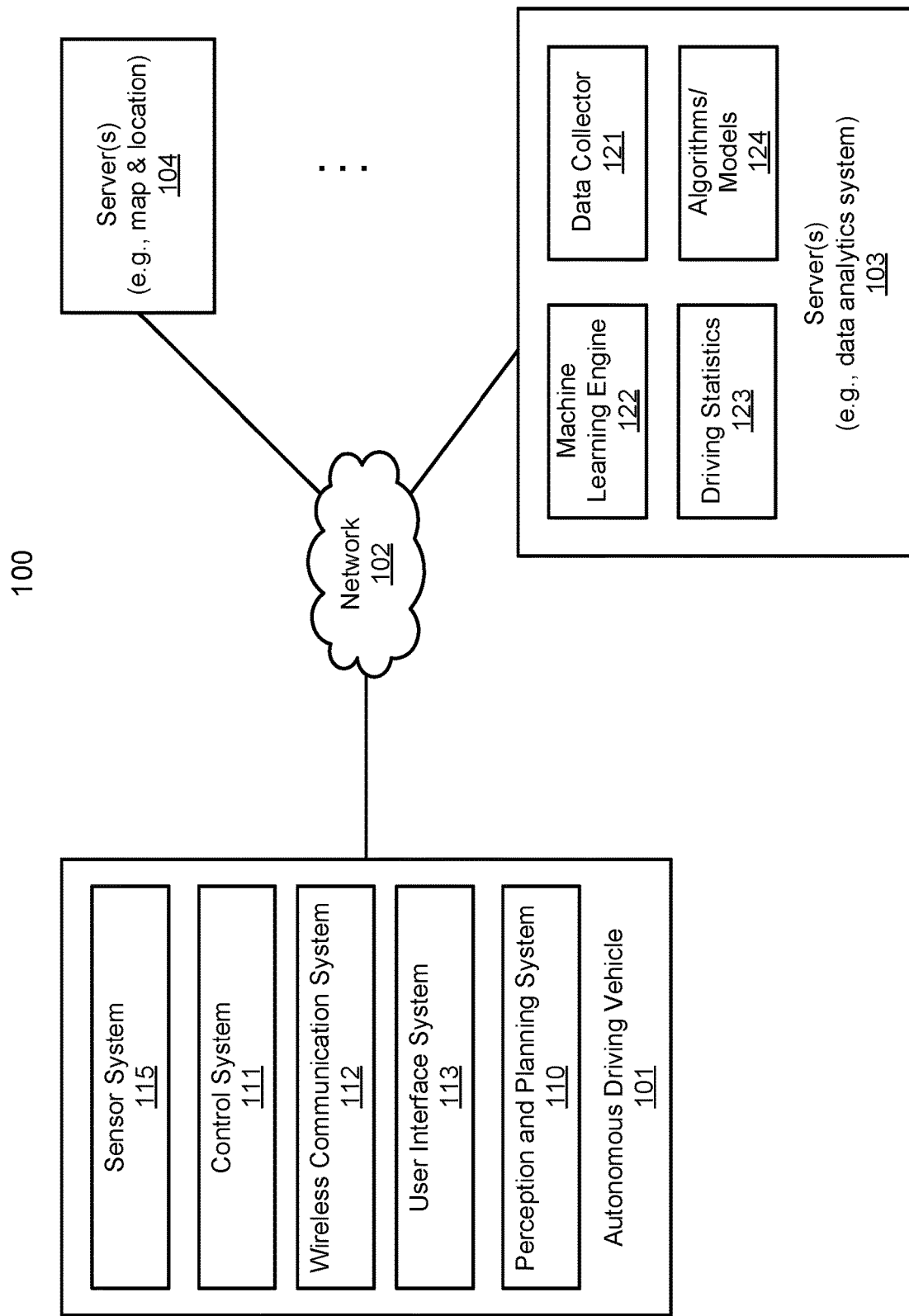
FIG. 1 is a block diagram illustrating a networked system according to one embodiment.

Various embodiments and aspects of the disclosures will be described with reference to details discussed below, and the accompanying drawings will illustrate the various embodiments. The following description and drawings are illustrative of the disclosure and are not to be construed as limiting the disclosure. Numerous specific details are described to provide a thorough understanding of various embodiments of the present disclosure. However, in certain instances, well-known or conventional details are not described in order to provide a concise discussion of embodiments of the present disclosures.

Reference in the specification to "one embodiment" or "an embodiment" means that a particular feature, structure, or characteristic described in conjunction with the embodiment can be included in at least one embodiment of the disclosure. The appearances of the phrase "in one embodiment" in various places in the specification do not necessarily all refer to the same embodiment.

According to one embodiment, during a planning stage of autonomous driving of an autonomous driving vehicle (ADV), it is determined that the ADV needs to change lanes from a source lane (e.g., a current lane) to a target lane (e.g., a destination lane). A first trajectory is generated from a current location of the ADV in the source lane to the target lane such as a center line of the target lane. The first trajectory is formed from the current location of the ADV in the source lane to a target point of a center line of the target lane. A lane shifting correction is then calculated based on the lane configuration of at least the source lane and/or target lane, as well as the current state of the ADV (e.g., location, speed, heading direction, etc.). Based on the lane shifting correction, at least the starting point of the first trajectory is modified, which in turn generates a second trajectory. In one embodiment, the starting point of the first trajectory is shifted laterally with respect to a heading direction of the source lane based on the lane shifting correction.

Thereafter, during the control stage, the second trajectory is utilized to control the ADV to change lanes from the source lane to the target lane. During the control stage, according to one embodiment, a control module receives the second trajectory from the planning stage. The control module is configured to issue various control commands (e.g., throttle commands, brake commands, steering commands) to drive the ADV to change lanes from the source lane to the target lane according to the second trajectory. In response to the second trajectory, the control module can detect that at least the starting point of the second trajectory is off compared to the current location of the ADV, which may be represented by the lane shifting correction calculated during the planning stage. As a result, the control module may issue a steering control command to modify the heading direction of the ADV based on the difference or error between the starting point of the second trajectory and the current location of the ADV. In this configuration, the control module treats the error as a drifting error. By issuing an additional steering control command, the control module compensates the error, which in turn modifies the time of lane changing.

In one embodiment, the lane shifting correction is determined based on at least one of the lane width of the source lane and/or target lane, the speed of the ADV, the desired time or expected time to complete the lane changing, and the time duration of a planning cycle performed by the planning module. For example, if the planning module wishes to shorten the lane changing time, the planning module can shift at least the starting point of the trajectory lateral towards the target lane based on the lane shifting correction. When the control module receives the modified trajectory, the control module detects that the ADV drifted to the right. In response, the control module generates a steering control command or modifies a turning angle of a planned steering command to turn the ADV towards the target lane or towards the target lane further. As a result, the ADV can change lanes quicker. Similarly, if the planning module wishes to slow down the lane changing, the planning module can shift at least the starting point of the trajectory away from the target lane, and the control module generates a steering command to modify the heading direction of the ADV away from the target lane, which in turn slows down the lane changing.

FIG. 1 is a block diagram illustrating an autonomous vehicle network configuration according to one embodiment of the disclosure. Referring to FIG. 1, network configuration 100 includes autonomous vehicle 101 that may be communicatively coupled to one or more servers 103-104 over a network 102. Although there is one autonomous vehicle shown, multiple autonomous vehicles can be coupled to each other and/or coupled to servers 103-104 over network 102. Network 102 may be any type of networks such as a local area network (LAN), a wide area network (WAN) such as the Internet, a cellular network, a satellite network, or a combination thereof, wired or wireless. Server(s) 103-104 may be any kind of servers or a cluster of servers, such as Web or cloud servers, application servers, backend servers, or a combination thereof. Servers 103-104 may be data analytics servers, content servers, traffic information servers, map and point of interest (MPOI) severs, or location servers, etc.

An autonomous vehicle refers to a vehicle that can be configured to in an autonomous mode in which the vehicle navigates through an environment with little or no input from a driver. Such an autonomous vehicle can include a sensor system having one or more sensors that are configured to detect information about the environment in which the vehicle operates. The vehicle and its associated controller(s) use the detected information to navigate through the environment. Autonomous vehicle 101 can operate in a manual mode, a full autonomous mode, or a partial autonomous mode.

In one embodiment, autonomous vehicle 101 includes, but is not limited to, perception and planning system 110, vehicle control system 111, wireless communication system 112, user interface system 113, infotainment system 114, and sensor system 115. Autonomous vehicle 101 may further include certain common components included in ordinary vehicles, such as, an engine, wheels, steering wheel, transmission, etc., which may be controlled by vehicle control system 111 and/or perception and planning system 110 using a variety of communication signals and/or commands, such as, for example, acceleration signals or commands, deceleration signals or commands, steering signals or commands, braking signals or commands, etc.

Components 110-115 may be communicatively coupled to each other via an interconnect, a bus, a network, or a combination thereof. For example, components 110-115 may be communicatively coupled to each other via a controller area network (CAN) bus. A CAN bus is a vehicle bus standard designed to allow microcontrollers and devices to communicate with each other in applications without a host computer. It is a message-based protocol, designed originally for multiplex electrical wiring within automobiles, but is also used in many other contexts.

Figure 2:
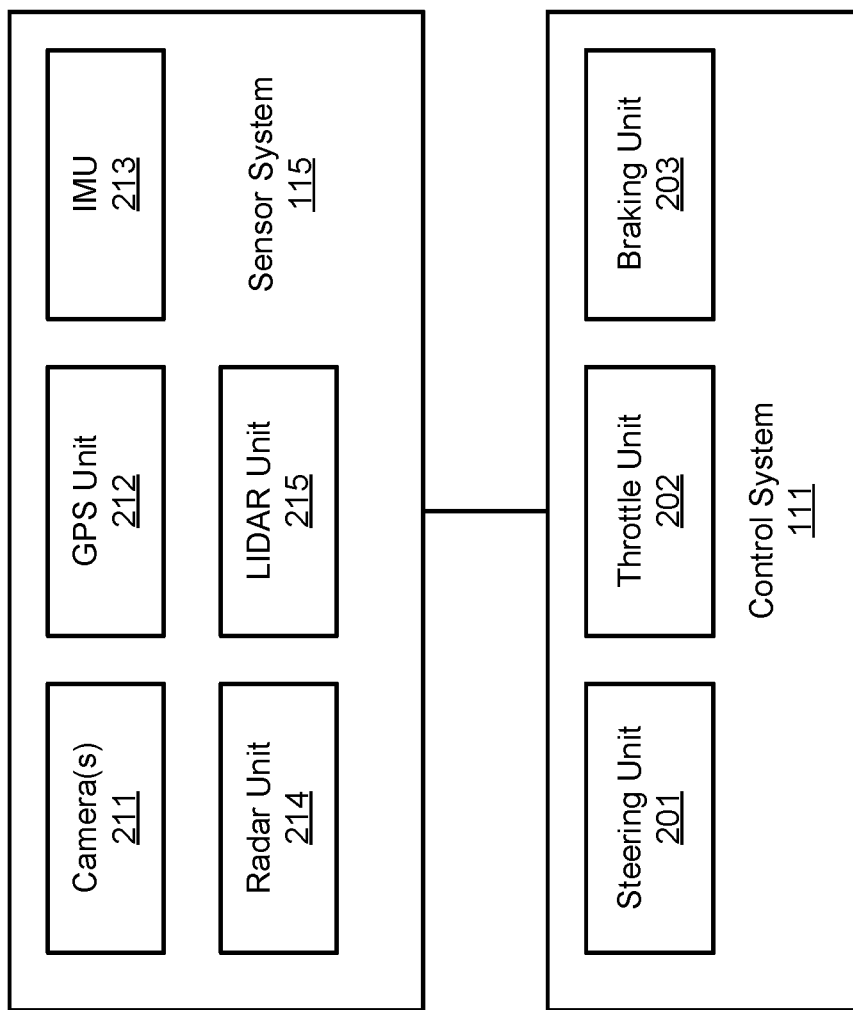
FIG. 2 is a block diagram illustrating an example of an autonomous vehicle according to one embodiment.

Referring now to FIG. 2, in one embodiment, sensor system 115 includes, but it is not limited to, one or more cameras 211, global positioning system (GPS) unit 212, inertial measurement unit (IMU) 213, radar unit 214, and a light detection and range (LIDAR) unit 215. GPS system 212 may include a transceiver operable to provide information regarding the position of the autonomous vehicle. IMU unit 213 may sense position and orientation changes of the autonomous vehicle based on inertial acceleration. Radar unit 214 may represent a system that utilizes radio signals to sense objects within the local environment of the autonomous vehicle. In some embodiments, in addition to sensing objects, radar unit 214 may additionally sense the speed and/or heading of the objects. LIDAR unit 215 may sense objects in the environment in which the autonomous vehicle is located using lasers. LIDAR unit 215 could include one or more laser sources, a laser scanner, and one or more detectors, among other system components. Cameras 211 may include one or more devices to capture images of the environment surrounding the autonomous vehicle. Cameras 211 may be still cameras and/or video cameras. A camera may be mechanically movable, for example, by mounting the camera on a rotating and/or tilting a platform.

Sensor system 115 may further include other sensors, such as, a sonar sensor, an infrared sensor, a steering sensor, a throttle sensor, a braking sensor, and an audio sensor (e.g., microphone). An audio sensor may be configured to capture sound from the environment surrounding the autonomous vehicle. A steering sensor may be configured to sense the steering angle of a steering wheel, wheels of the vehicle, or a combination thereof. A throttle sensor and a braking sensor sense the throttle position and braking position of the vehicle, respectively. In some situations, a throttle sensor and a braking sensor may be integrated as an integrated throttle/braking sensor.

In one embodiment, vehicle control system 111 includes, but is not limited to, steering unit 201, throttle unit 202 (also referred to as an acceleration unit), and braking unit 203. Steering unit 201 is to adjust the direction or heading of the vehicle. Throttle unit 202 is to control the speed of the motor or engine that in turn control the speed and acceleration of the vehicle. Braking unit 203 is to decelerate the vehicle by providing friction to slow the wheels or tires of the vehicle. Note that the components as shown in FIG. 2 may be implemented in hardware, software, or a combination thereof.

Referring back to FIG. 1, wireless communication system 112 is to allow communication between autonomous vehicle 101 and external systems, such as devices, sensors, other vehicles, etc. For example, wireless communication system 112 can wirelessly communicate with one or more devices directly or via a communication network, such as servers 103-104 over network 102. Wireless communication system 112 can use any cellular communication network or a wireless local area network (WLAN), e.g., using WiFi to communicate with another component or system. Wireless communication system 112 could communicate directly with a device (e.g., a mobile device of a passenger, a display device, a speaker within vehicle 101), for example, using an infrared link, Bluetooth, etc. User interface system 113 may be part of peripheral devices implemented within vehicle 101 including, for example, a keyword, a touch screen display device, a microphone, and a speaker, etc.

Some or all of the functions of autonomous vehicle 101 may be controlled or managed by perception and planning system 110, especially when operating in an autonomous driving mode. Perception and planning system 110 includes the necessary hardware (e.g., processor(s), memory, storage) and software (e.g., operating system, planning and routing programs) to receive information from sensor system 115, control system 111, wireless communication system 112, and/or user interface system 113, process the received information, plan a route or path from a starting point to a destination point, and then drive vehicle 101 based on the planning and control information. Alternatively, perception and planning system 110 may be integrated with vehicle control system 111.

For example, a user as a passenger may specify a starting location and a destination of a trip, for example, via a user interface. Perception and planning system 110 obtains the trip related data. For example, perception and planning system 110 may obtain location and route information from an MPOI server, which may be a part of servers 103-104. The location server provides location services and the MPOI server provides map services and the POIs of certain locations. Alternatively, such location and MPOI information may be cached locally in a persistent storage device of perception and planning system 110.

While autonomous vehicle 101 is moving along the route, perception and planning system 110 may also obtain real-time traffic information from a traffic information system or server (TIS). Note that servers 103-104 may be operated by a third party entity. Alternatively, the functionalities of servers 103-104 may be integrated with perception and planning system 110. Based on the real-time traffic information, MPOI information, and location information, as well as real-time local environment data detected or sensed by sensor system 115 (e.g., obstacles, objects, nearby vehicles), perception and planning system 110 can plan an optimal route and drive vehicle 101, for example, via control system 111, according to the planned route to reach the specified destination safely and efficiently.

Server 103 may be a data analytics system to perform data analytics services for a variety of clients. In one embodiment, data analytics system 103 includes data collector 121 and machine learning engine 122. Data collector 121 collects driving statistics 123 from a variety of vehicles, either autonomous vehicles or regular vehicles driven by human drivers. Driving statistics 123 include information indicating the driving commands (e.g., throttle, brake, steering commands) issued and responses of the vehicles (e.g., speeds, accelerations, decelerations, directions) captured by sensors of the vehicles at different points in time. Driving statistics 123 may further include information describing the driving environments at different points in time, such as, for example, routes (including starting and destination locations), MPOIs, road conditions, weather conditions, etc.

Based on driving statistics 123, machine learning engine 122 generates or trains a set of rules, algorithms, and/or predictive models 124 for a variety of purposes. In one embodiment, algorithms 124 include an algorithm to calculate a lane shifting error or correction for adjusting lane changing trajectories in view of the lane configuration and the current state of the vehicle. Algorithms 124 can then be uploaded onto an ADV to be utilized during the real-time autonomous driving for drifting correction.

Figure 3A:
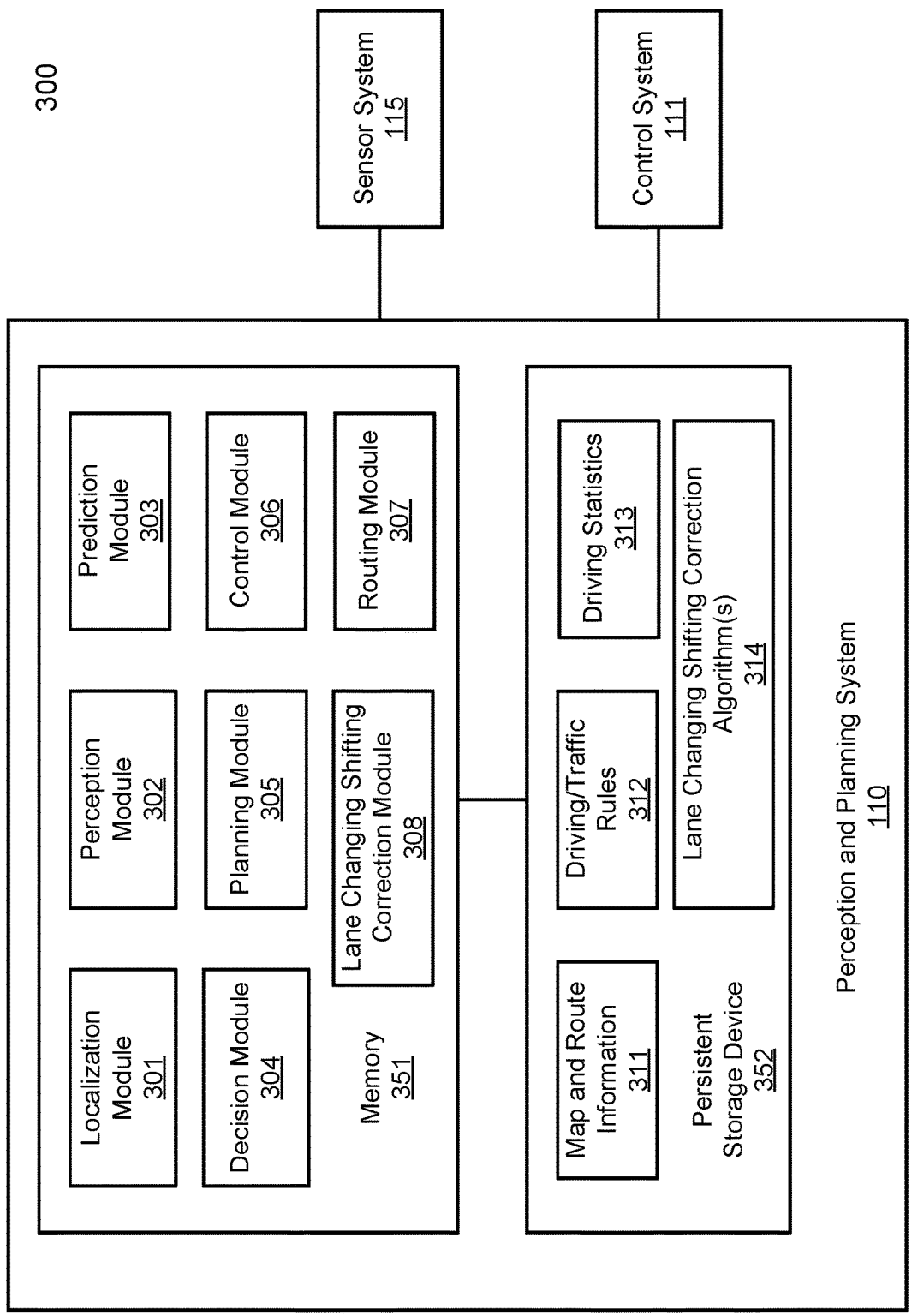
FIGS. 3A-3B are block diagrams illustrating an example of a perception and planning system used with an autonomous vehicle according to one embodiment.
Figure 3B:
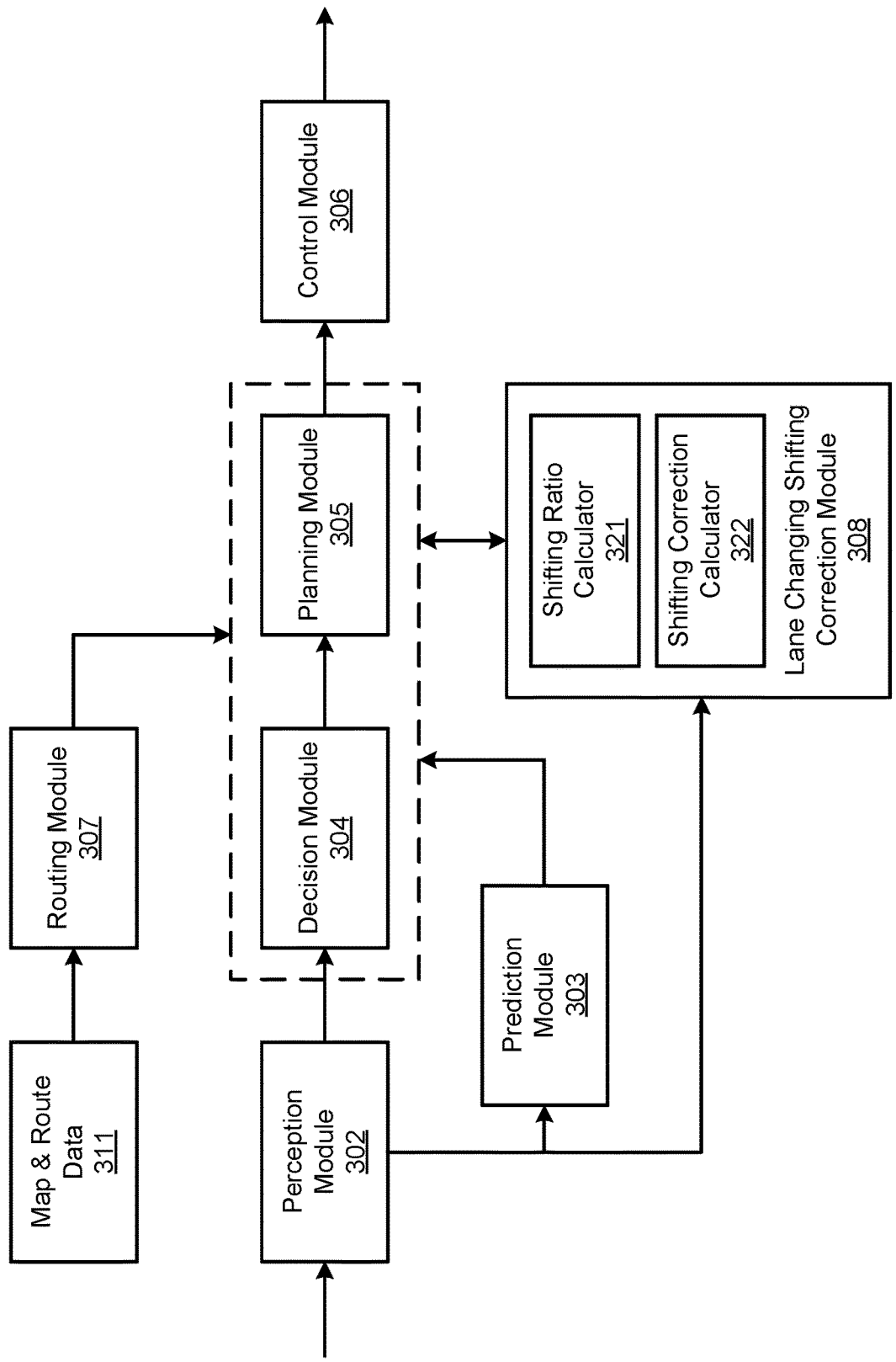

FIGS. 3A and 3B are block diagrams illustrating an example of a perception and planning system used with an autonomous vehicle according to one embodiment. System 300 may be implemented as a part of autonomous vehicle 101 of FIG. 1 including, but is not limited to, perception and planning system 110, control system 111, and sensor system 115. Referring to FIGS. 3A-3B, perception and planning system 110 includes, but is not limited to, localization module 301, perception module 302, prediction module 303, decision module 304, planning module 305, control module 306, routing module 307, and drifting correction module 308.

Some or all of modules 301-308 may be implemented in software, hardware, or a combination thereof. For example, these modules may be installed in persistent storage device 352, loaded into memory 351, and executed by one or more processors (not shown). Note that some or all of these modules may be communicatively coupled to or integrated with some or all modules of vehicle control system 111 of FIG. 2. Some of modules 301-308 may be integrated together as an integrated module.

Localization module 301 determines a current location of autonomous vehicle 300 (e.g., leveraging GPS unit 212) and manages any data related to a trip or route of a user. Localization module 301 (also referred to as a map and route module) manages any data related to a trip or route of a user. A user may log in and specify a starting location and a destination of a trip, for example, via a user interface. Localization module 301 communicates with other components of autonomous vehicle 300, such as map and route information 311, to obtain the trip related data. For example, localization module 301 may obtain location and route information from a location server and a map and POI (MPOI) server. A location server provides location services and an MPOI server provides map services and the POIs of certain locations, which may be cached as part of map and route information 311. While autonomous vehicle 300 is moving along the route, localization module 301 may also obtain real-time traffic information from a traffic information system or server.

Based on the sensor data provided by sensor system 115 and localization information obtained by localization module 301, a perception of the surrounding environment is determined by perception module 302. The perception information may represent what an ordinary driver would perceive surrounding a vehicle in which the driver is driving. The perception can include the lane configuration (e.g., straight or curve lanes), traffic light signals, a relative position of another vehicle, a pedestrian, a building, crosswalk, or other traffic related signs (e.g., stop signs, yield signs), etc., for example, in a form of an object.

Perception module 302 may include a computer vision system or functionalities of a computer vision system to process and analyze images captured by one or more cameras in order to identify objects and/or features in the environment of autonomous vehicle. The objects can include traffic signals, road way boundaries, other vehicles, pedestrians, and/or obstacles, etc. The computer vision system may use an object recognition algorithm, video tracking, and other computer vision techniques. In some embodiments, the computer vision system can map an environment, track objects, and estimate the speed of objects, etc. Perception module 302 can also detect objects based on other sensors data provided by other sensors such as a radar and/or LIDAR.

For each of the objects, prediction module 303 predicts what the object will behave under the circumstances. The prediction is performed based on the perception data perceiving the driving environment at the point in time in view of a set of map/rout information 311 and traffic rules 312. For example, if the object is a vehicle at an opposing direction and the current driving environment includes an intersection, prediction module 303 will predict whether the vehicle will likely move straight forward or make a turn. If the perception data indicates that the intersection has no traffic light, prediction module 303 may predict that the vehicle may have to fully stop prior to enter the intersection. If the perception data indicates that the vehicle is currently at a left-turn only lane or a right-turn only lane, prediction module 303 may predict that the vehicle will more likely make a left turn or right turn respectively.

For each of the objects, decision module 304 makes a decision regarding how to handle the object. For example, for a particular object (e.g., another vehicle in a crossing route) as well as its metadata describing the object (e.g., a speed, direction, turning angle), decision module 304 decides how to encounter the object (e.g., overtake, yield, stop, pass). Decision module 304 may make such decisions according to a set of rules such as traffic rules or driving rules 312, which may be stored in persistent storage device 352.

Routing module 307 is configured to provide one or more routes or paths from a starting point to a destination point. For a given trip from a start location to a destination location, for example, received from a user, routing module 307 obtains route and map information 311 and determines all possible routes or paths from the starting location to reach the destination location. Routing module 307 may generate a reference line in a form of a topographic map for each of the routes it determines from the starting location to reach the destination location. A reference line refers to an ideal route or path without any interference from others such as other vehicles, obstacles, or traffic condition. That is, if there is no other vehicle, pedestrians, or obstacles on the road, an ADV should exactly or closely follows the reference line. The topographic maps are then provided to decision module 304 and/or planning module 305. Decision module 304 and/or planning module 305 examine all of the possible routes to select and modify one of the most optimal route in view of other data provided by other modules such as traffic conditions from localization module 301, driving environment perceived by perception module 302, and traffic condition predicted by prediction module 303. The actual path or route for controlling the ADV may be close to or different from the reference line provided by routing module 307 dependent upon the specific driving environment at the point in time.

Based on a decision for each of the objects perceived, planning module 305 plans a path or route for the autonomous vehicle, as well as driving parameters (e.g., distance, speed, and/or turning angle), using a reference line provided by routing module 307 as a basis. That is, for a given object, decision module 304 decides what to do with the object, while planning module 305 determines how to do it. For example, for a given object, decision module 304 may decide to pass the object, while planning module 305 may determine whether to pass on the left side or right side of the object. Planning and control data is generated by planning module 305 including information describing how vehicle 300 would move in a next moving cycle (e.g., next route/path segment). For example, the planning and control data may instruct vehicle 300 to move 10 meters at a speed of 30 mile per hour (mph), then change to a right lane at the speed of 25 mph.

Based on the planning and control data, control module 306 controls and drives the autonomous vehicle, by sending proper commands or signals to vehicle control system 111, according to a route or path defined by the planning and control data. The planning and control data include sufficient information to drive the vehicle from a first point to a second point of a route or path using appropriate vehicle settings or driving parameters (e.g., throttle, braking, steering commands) at different points in time along the path or route.

In one embodiment, the planning phase is performed in a number of planning cycles, also referred to as driving cycles, such as, for example, in every time interval of 100 to 200 milliseconds (ms). For each of the planning cycles or driving cycles, one or more control commands will be issued based on the planning and control data. That is, for every 100 ms, planning module 305 plans a next route segment or path segment, for example, including a target position and the time required for the ADV to reach the target position. Alternatively, planning module 305 may further specify the specific speed, direction, and/or steering angle, etc. In one embodiment, planning module 305 plans a route segment or path segment for the next predetermined period of time such as 5 seconds. For each planning cycle, planning module 305 plans a target position for the current cycle (e.g., next 5 seconds) based on a target position planned in a previous cycle. Control module 306 then generates one or more control commands (e.g., throttle, brake, steering control commands) based on the planning and control data of the current cycle.

Note that decision module 304 and planning module 305 may be integrated as an integrated module. Decision module 304/planning module 305 may include a navigation system or functionalities of a navigation system to determine a driving path for the autonomous vehicle. For example, the navigation system may determine a series of speeds and directional headings to affect movement of the autonomous vehicle along a path that substantially avoids perceived obstacles while generally advancing the autonomous vehicle along a roadway-based path leading to an ultimate destination. The destination may be set according to user inputs via user interface system 113. The navigation system may update the driving path dynamically while the autonomous vehicle is in operation. The navigation system can incorporate data from a GPS system and one or more maps so as to determine the driving path for the autonomous vehicle.

According to one embodiment, when there is a need to change lanes from a source lane to a target lane, planning module 305 may invoke lane changing shifting correction module 308 to determine and calculate a lane shifting correction, for example, using lane changing shifting correction algorithm(s) 314. The lane changing shifting correction algorithm(s) 314 may be created based on a large amount of driving statistics of various vehicles, where algorithm(s) 314 may be created by a data analysis system such as server 103 as a part of algorithms 124 of FIG. 1. The lane shifting correction may be utilized to shift at least the starting point of a lane changing trajectory during the planning stage. Such a shifted lane changing trajectory may cause the control module 306 during the control stage to perform a correction action similar to a drifting correction by issuing one or more steering control commands to compensate the shifting/drifting error, which in turn accelerates or decelerates the lane changing transaction. Thus, embodiments of the invention to generate a smooth lane changing trajectory include planning a lane changing trajectory during the planning stage and a shifting correction during the control stage to accelerate or decelerate the lane changing. Note that the functionalities of the lane changing shifting correction module 308 may be integrated as a part of planning module 305 and/or control module 306.

Referring back to FIGS. 3A-3B, according to one embodiment, a request for an ADV to change lanes from a source lane to a target lane is received at a particular driving cycle, for example, from decision module 304, which decides there is a need to change lanes given the driving environment under the circumstances. In response to the lane changing request, planning module 305 plans and generates a first lane changing trajectory from the source lane to the target lane. The first lane changing trajectory is typically from the current location of the ADV within the source lane to a point in the center line of the target lane. A trajectory typically includes a series or sequence of trajectory points distributed relatively evenly when connected form a continuous curve. Each trajectory point is associated with trajectory point data, including an expected location of the ADV (e.g., x, y, coordinates), an expected speed of the ADV, an expected heading direction of the ADV, and/or acceleration/deceleration of the ADV. Such a trajectory is utilized as a reference trajectory by control module 306 to issue proper control commands to drive the ADV following the trajectory as close as possible.

In one embodiment, once the first lane changing trajectory has been generated, planning module 305 invokes the lane changing shifting correction module 308 to determine and calculate a lane shifting correction or correction value based on the lane configuration and the current state of the ADV. The lane configuration includes information describing the source lane, the target lane, and/or the lane width of the source lane, etc. The current state of the ADV includes the current location, speed, and/or heading direction of the ADV. Planning module 305 shifts at least the starting point of the first trajectory based on the lane shifting correction, for example, laterally shifting the starting point (e.g., left or right shifting with respect to the longitudinal direction of the source lane), and a second trajectory is generated as a result.

In one embodiment, lane changing shifting correction module 308 includes shifting ratio calculator 321 and shifting correction calculator 322. Shifting ratio calculator 321 is configured to calculate a shifting ratio between the lane width of the source lane or target lane (assuming the lane widths of the source and target lanes are identical), and the lane changing distance. Shifting correction calculator 322 is configured to calculate the lane shifting correction based on the shifting ratio and the time duration of the planning cycles (or planning frequency). The details of such calculations will be described further below. Note that shifting ratio calculator 321 and shifting correction calculator 322 may be integrated into a single module.

The second trajectory is then provided to control module 306. Since at least the starting point of the first trajectory and the first trajectory was generated based on the current location of the ADV, the control module 306 may detect that the current location of the ADV is off from the expected location represented by the starting location of the second trajectory. In this scenario, the control module 306 considers that such an offset is a drifting error. In response, control module 306 will perform a lane shifting correction, similar to a lateral error or drifting error correction. In one embodiment, control module 306 may issue an additional steering control command or modify a steering angle of a planned steering command to modify the heading direction or changing rate of the heading direction of the ADV towards or away from the target lane. Such a correction may cause the lane changing of the ADV to accelerate or decelerate entering the target lane.

Figure 4:
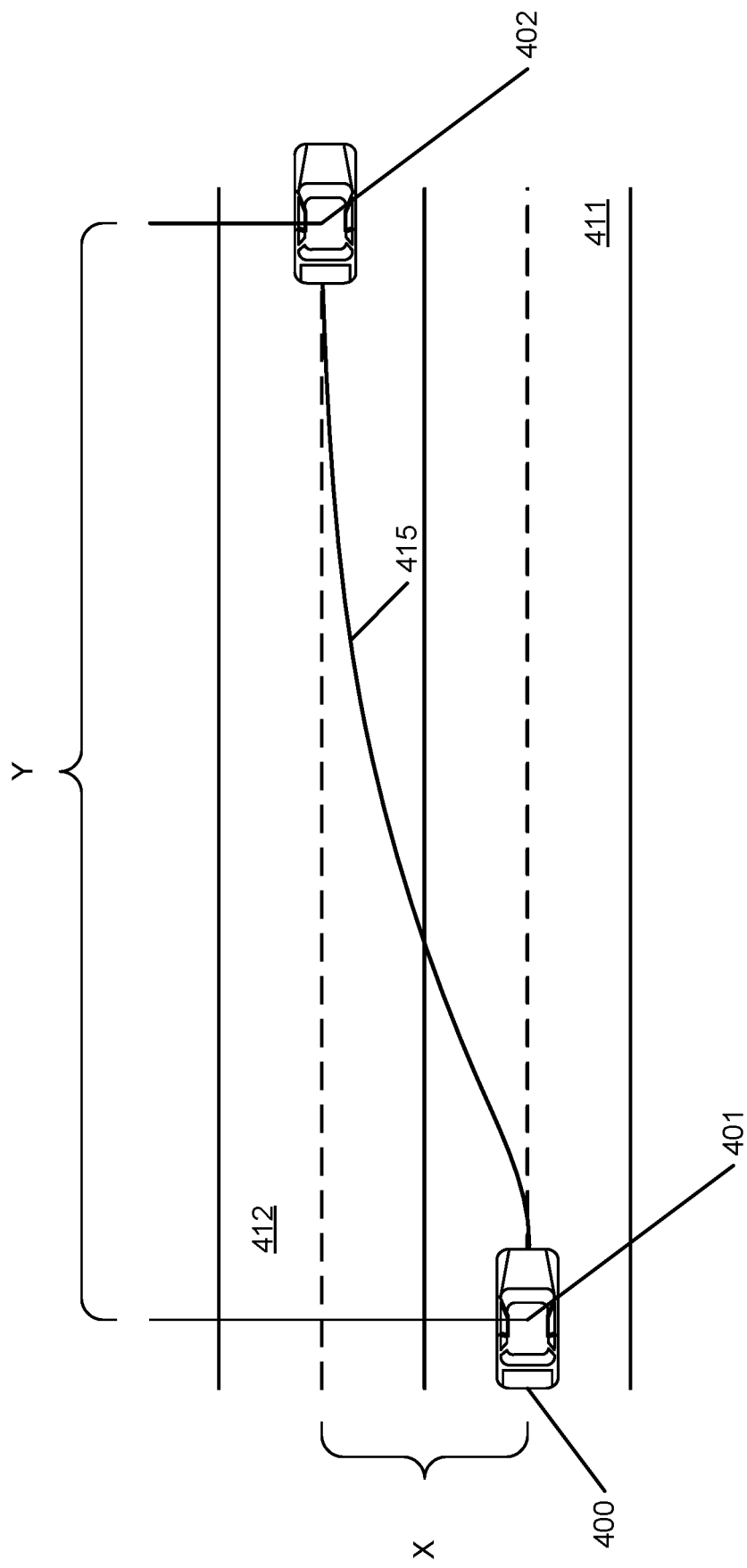
FIG. 4 is a diagram illustrating a lane changing driving scenario according to one embodiment.

Referring now to FIG. 4, in this example, it is determined that ADV 400 needs to change lanes from lane 411 as a source lane to lane 412 as a target lane. In response, the planning module 305 plans and generates a lane changing trajectory 415 from a current location 401 of source lane 411 to a target location 402 of target lane 412. In generating trajectory 415, an optimization may be performed to smooth the trajectory, for example, using a polynomial function to fit a smooth curve from current location 401 to target location 402.

In addition, according to one embodiment, planning module 305 may invoke the lane changing shifting correction module 308 to determine and calculate a lane shifting correction, where the changing shifting correction module 308 may be integrated with planning module 305. In one embodiment, shifting ratio calculator 321 is configured to calculate a lane shifting ratio based on the lane configuration and the current state of ADV 400. The lane configuration includes at least the lane width of source lane 411 and target lane 412. In most cases, it can be assumed that both source lane 411 and target lane 412 have the same lane width. Thus, the lane width can represent a distance between the center line of source lane 411 and target lane 412. Alternatively, the distance between the center lines of source lane 411 and target lane 412 can be measured, for example, based on sensor data obtained from sensors (e.g., cameras). The current state of ADV 400 includes at least the current speed and/or current location of ADV 400.

In one embodiment, the lane shifting ratio refers to a ratio of a lateral distance (X) between the centerlines of source lane 411 and target lane 412 over a longitudinal distance (Y) between current location 401 and target location 402, in view of the current speed (V) of ADV 400. The longitudinal distance Y can be obtained based on the current speed V of ADV 400 and the desired lane changing time (T) to reach target location 402 from current location 401, i.e., Y=T*V. Thus, the lane shifting ratio (R) can be calculated by shifting ratio calculator 321 as follows:

$$R=X/Y=X/(T*V).$$

In one embodiment, if the current speed V of ADV is less than 10 meters per second (m/s), for the lane shifting ratio calculation purpose, the speed of the ADV is assigned to 10 m/s. Thus, the minimum speed for lane changing shifting calculation is limited to at least 10 m/s. In one embodiment, the desired lane changing time T is ranging approximately from 2 to 5 seconds. In a particular embodiment, the desired lane changing time T=4 seconds.

Once the lane shifting ratio R has been determined, according to one embodiment, shifting correction calculator 322 is invoked to calculator a lane shifting correction (S) based on the lane shifting ratio. The lane shifting correction S may be calculated based on a planning frequency (A) associated with the planning cycles. As described above, the trajectory planning processes are performed in planning cycles or driving cycles. Thus, the planning process is performed for approximately every 100 milliseconds (ms), which correspond to approximately 10 Hz. In one embodiment, the lane shifting correction S can be calculated as follows:

$$S=R/A=X*(1/A)/(T*V)$$

Figure 5A:
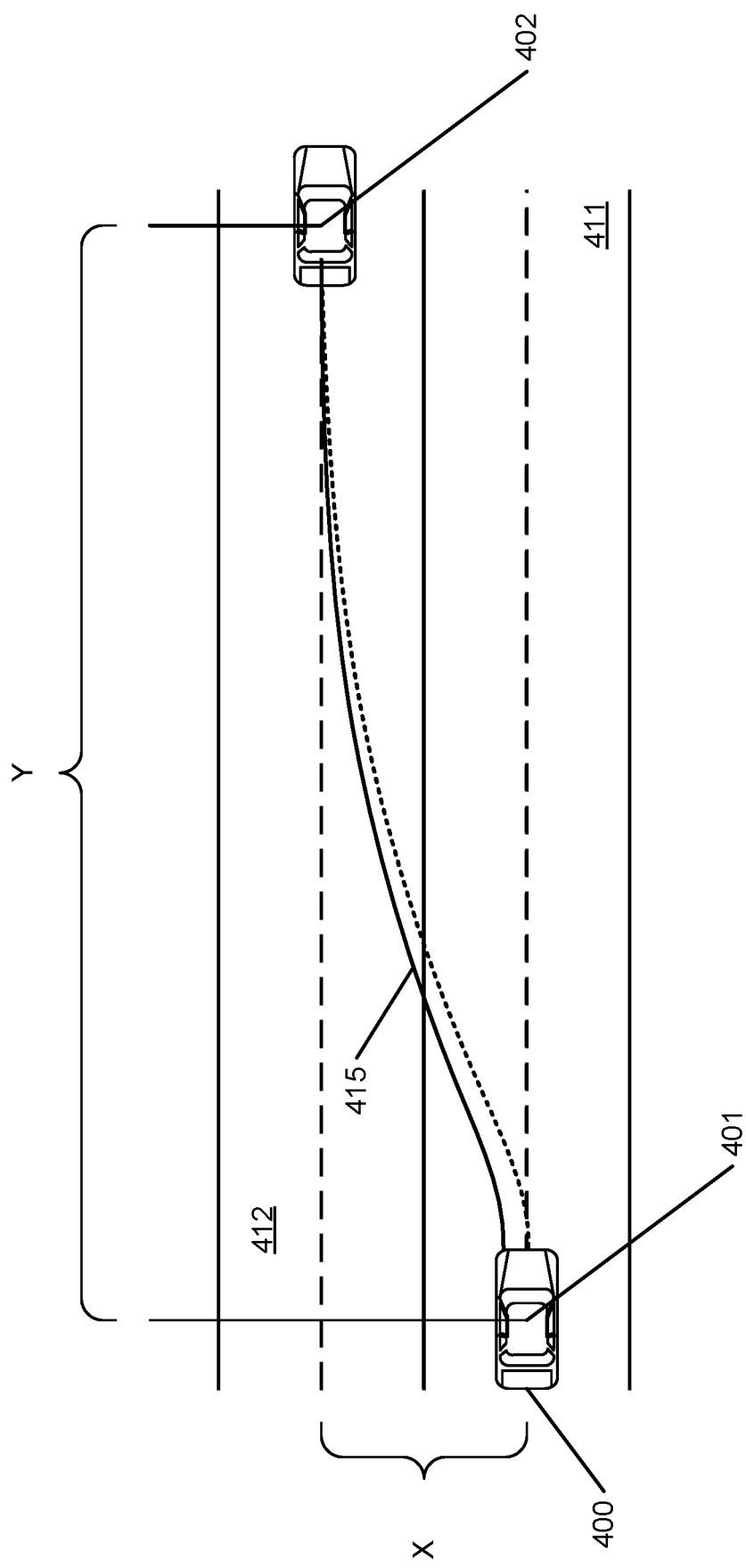
FIGS. 5A and 5B are diagrams illustrating a lane changing driving scenario according to certain embodiments.
Figure 5B:
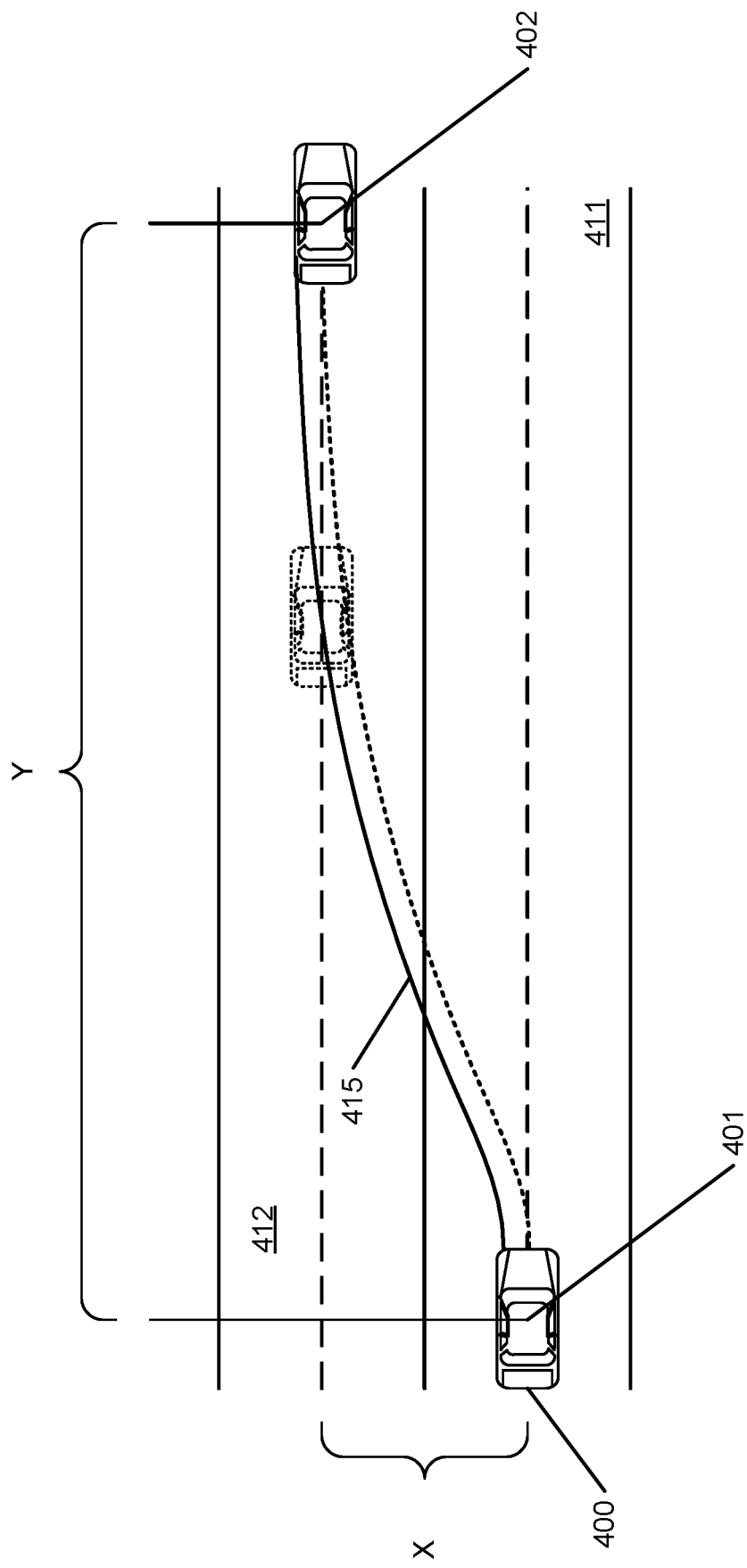

Once the lane shifting correction S has been determined, the lane changing time can be adjusted by shifting at least the starting point of the lane changing trajectory laterally based on the lane shifting correction S. For example, if there is a need to shorten the lane changing time (e.g., accelerating lane changing), at least the starting point of lane changing trajectory can be shifted towards the target lane 412 as shown in FIG. 5A. Alternatively, the entire trajectory is shifted laterally based on the lane shifting correction as shown in FIG. 5B. The shifted lane changing trajectory can then be provided to control module 306.

In response to the shifted or modified lane changing trajectory, the control module 306 can detect that the ADV 400 is off laterally, similar to a drifting error. As described above, control module 306 utilizes the trajectory generated by planning module 305 as a reference to control the ADV to follow the trajectory as close as possible. When the trajectory is shifted lateral, control module 306 detects that the current location of the ADV is "off" significantly from the trajectory. Control module 306 may consider this error is a drifting error. As a result, in order to compensate to correct such an error, control module 306 issues an additional steering control command or increases a steering angle of an already planned steering control command to modify the heading direction of the ADV to attempt to move the ADV back to be closer to the trajectory, i.e., to correct the drifting error.

In one embodiment, control module 306 generates one or more steering control commands to modify the heading direction of the ADV towards the shifting direction of the trajectory, such that the ADV moves according to the shifting direction of the trajectory. For example, if the lane changing trajectory is shifted towards the target lane 412 (e.g., towards left), control module 306 considers a drifting error corresponding to the lane shifting correction away from the target lane 412 (e.g., towards right). As a result, control module 306 generates a steering control command to cause the ADV to move towards left, which provides a faster and smooth lane changing process. On the other hand, if the lane changing trajectory is shifted away from target lane 412, control module 306 will treat it like a drifting error towards the target lane (e.g., left) since the current location of the ADV is now between the trajectory and target lane (e.g., on the left of the trajectory). As a result, control module 306 will generate one or more steering control commands to drive the ADV away from the target lane to attempt correcting the drifting error (e.g., turning the ADV towards right), which provides a slower lane changing process.

Figure 6:
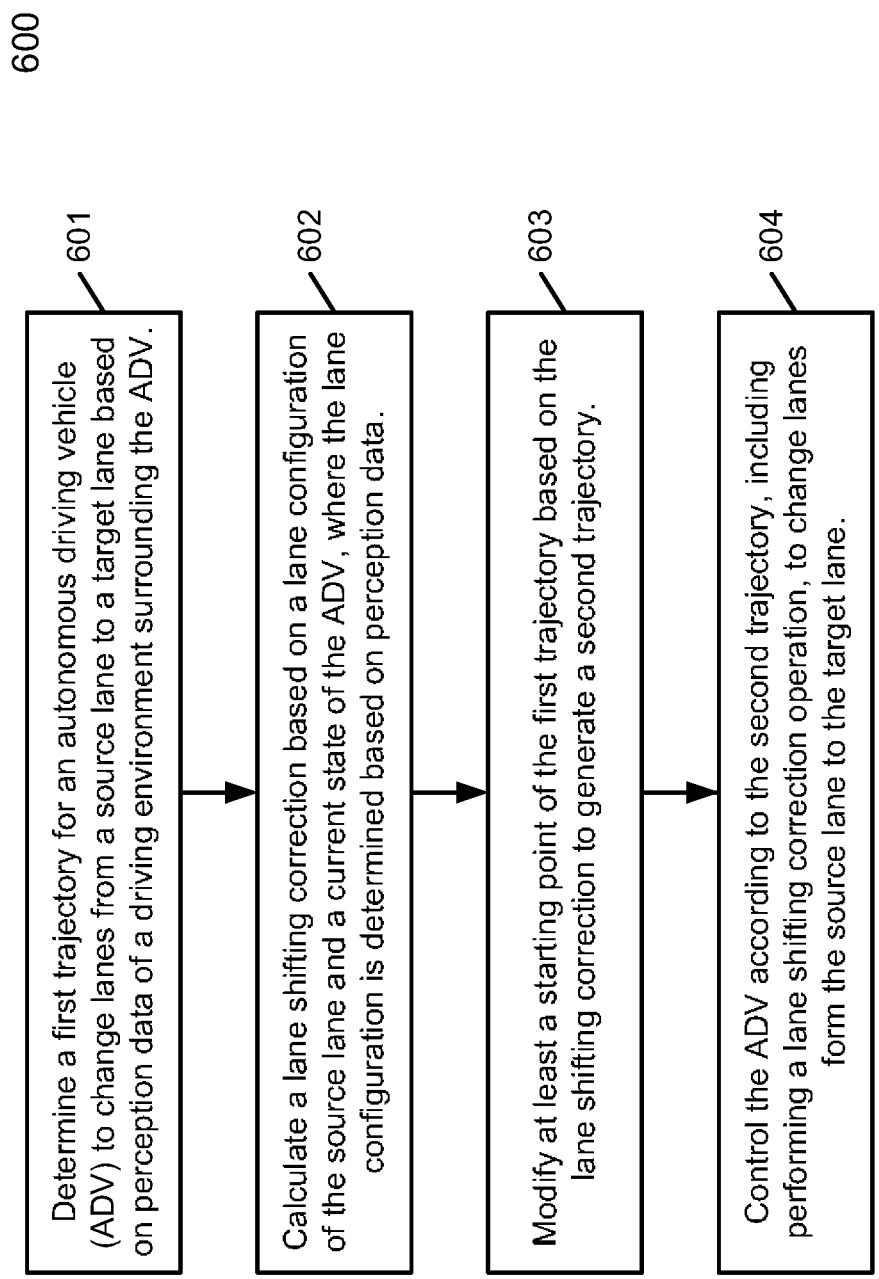
FIG. 6 is a flow diagram illustrating an example of a lane changing process according to one embodiment.

FIG. 6 is a flow diagram illustrating an example of a process of performing lane changing of an autonomous driving vehicle according to one embodiment of the invention. Process 600 may be performed by processing logic which may include software, hardware, or a combination thereof. For example, process 600 may be performed by planning module 305, control module 306, and/or lane changing shifting correction module 306. Referring to FIG. 6, in operation 601, processing logic determines a first trajectory for an ADV to change lanes from a source lane to a target lane based on perception data describing driving environment surrounding the ADV. In operation 602, processing logic calculates a lane shifting correction based on the lane configuration and the current state of the ADV. The lane configuration includes information indicating at least the lane width of the source lane and/or target lane. The current state of the ADV includes at least the current location and/or speed of the ADV. In one embodiment, processing logic calculates a lane shifting ratio based on the lane width, the desired lane changing time, and the current speed of the ADV. Based on the lane shifting ratio and the planning cycle, lane shifting correction is calculated.

In operation 603, at least the starting point of the lane changing trajectory is modified based on the lane shifting correction. For example, at least the starting point of the trajectory is shifted laterally based on the lane shifting correction. Alternatively, the entire trajectory is shifted laterally. In operation 604, processing logic controls the ADV according to the modified trajectory, including performing a lane shifting correction operation to change lanes form the source lane to the target lane. The lane shifting correction operation includes issuing a steering control command to modify the heading direction of the ADV, which in turn accelerates or decelerates the lane changing process. For example, if the trajectory has been shifted to left, processing logic can interpret that the vehicle has drifted to the right since the vehicle is located on the right side of the trajectory. As a result, processing logic generates a steering control command to modify the heading direction of the vehicle to cause the vehicle to move towards left in an attempt to get closer to the trajectory. Such a drifting correction performed during the control stage in turn changes the speed and time of lane changing.

Figure 7:
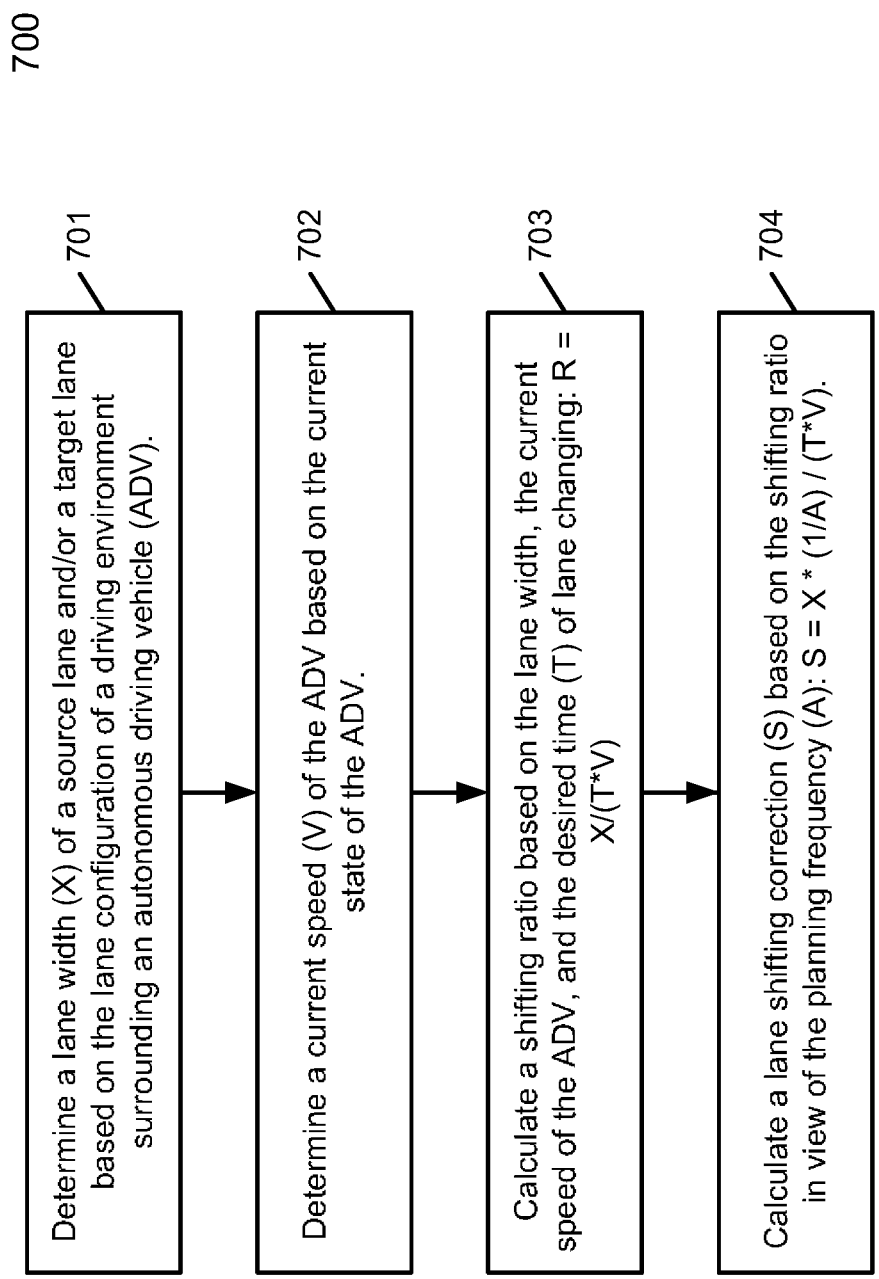
FIG. 7 is a flow diagram illustrating a process of determining a lane shifting correction according to one embodiment.

FIG. 7 is a flow diagram illustrating a process of determining a lane shifting correction according to one embodiment. Process 700 may be performed as a part of operation 602 of FIG. 6. Referring to FIG. 7, in operation 701, processing logic (e.g., planning module 305) determines a lane width X of a source lane and/or a target lane based on lane configuration that is determined based on perception data describing the driving environment surrounding an ADV. As described above, in most cases, it is assumed that the lane widths of the source lane and the target lane are the same. Otherwise, the term of a lane width herein for the purpose of lane changing refers to a distance between the centerline of the source lane and the centerline of the target lane. In operation 702, processing logic determines a current speed V of the ADV based on the current state of the ADV. In operation 703, processing logic calculates a shifting ratio R based on the lane width, the current speed of the ADV, and the desired lane changing time T: $R=X/(T*V)$. In operation 704, processing logic calculates lane shifting correction S based on the shifting ratio and in view of the planning frequency A: $S=X*(1/A)/(T*V)$.

Note that some or all of the components as shown and described above may be implemented in software, hardware, or a combination thereof. For example, such components can be implemented as software installed and stored in a persistent storage device, which can be loaded and executed in a memory by a processor (not shown) to carry out the processes or operations described throughout this application. Alternatively, such components can be implemented as executable code programmed or embedded into dedicated hardware such as an integrated circuit (e.g., an application specific IC or ASIC), a digital signal processor (DSP), or a field programmable gate array (FPGA), which can be accessed via a corresponding driver and/or operating system from an application. Furthermore, such components can be implemented as specific hardware logic in a processor or processor core as part of an instruction set accessible by a software component via one or more specific instructions.

Figure 8:
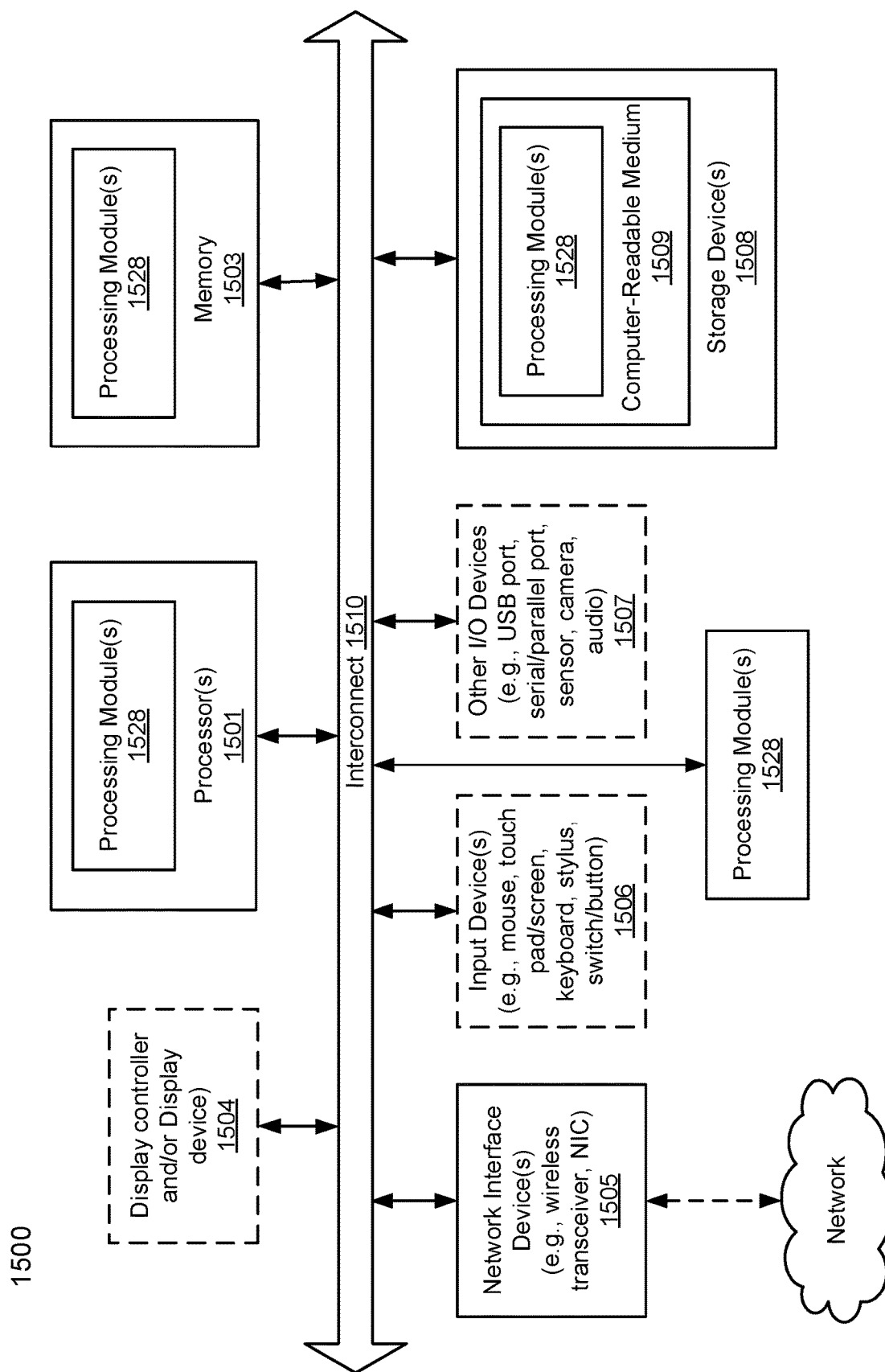
FIG. 8 is a block diagram illustrating a data processing system according to one embodiment.

FIG. 8 is a block diagram illustrating an example of a data processing system which may be used with one embodiment of the disclosure. For example, system 1500 may represent any of data processing systems described above performing any of the processes or methods described above, such as, for example, perception and planning system 110 or any of servers 103-104 of FIG. 1. System 1500 can include many different components. These components can be implemented as integrated circuits (ICs), portions thereof, discrete electronic devices, or other modules adapted to a circuit board such as a motherboard or add-in card of the computer system, or as components otherwise incorporated within a chassis of the computer system.

Note also that system 1500 is intended to show a high level view of many components of the computer system. However, it is to be understood that additional components may be present in certain implementations and furthermore, different arrangement of the components shown may occur in other implementations. System 1500 may represent a desktop, a laptop, a tablet, a server, a mobile phone, a media player, a personal digital assistant (PDA), a Smartwatch, a personal communicator, a gaming device, a network router or hub, a wireless access point (AP) or repeater, a set-top box, or a combination thereof. Further, while only a single machine or system is illustrated, the term "machine" or "system" shall also be taken to include any collection of machines or systems that individually or jointly execute a set (or multiple sets) of instructions to perform any one or more of the methodologies discussed herein.

In one embodiment, system 1500 includes processor 1501, memory 1503, and devices 1505-1508 connected via a bus or an interconnect 1510. Processor 1501 may represent a single processor or multiple processors with a single processor core or multiple processor cores included therein. Processor 1501 may represent one or more general-purpose processors such as a microprocessor, a central processing unit (CPU), or the like. More particularly, processor 1501 may be a complex instruction set computing (CISC) microprocessor, reduced instruction set computing (RISC) microprocessor, very long instruction word (VLIW) microprocessor, or processor implementing other instruction sets, or processors implementing a combination of instruction sets. Processor 1501 may also be one or more special-purpose processors such as an application specific integrated circuit (ASIC), a cellular or baseband processor, a field programmable gate array (FPGA), a digital signal processor (DSP), a network processor, a graphics processor, a communications processor, a cryptographic processor, a co-processor, an embedded processor, or any other type of logic capable of processing instructions.

Processor 1501, which may be a low power multi-core processor socket such as an ultra-low voltage processor, may act as a main processing unit and central hub for communication with the various components of the system. Such processor can be implemented as a system on chip (SoC). Processor 1501 is configured to execute instructions for performing the operations and steps discussed herein. System 1500 may further include a graphics interface that communicates with optional graphics subsystem 1504, which may include a display controller, a graphics processor, and/or a display device.

Processor 1501 may communicate with memory 1503, which in one embodiment can be implemented via multiple memory devices to provide for a given amount of system memory. Memory 1503 may include one or more volatile storage (or memory) devices such as random access memory (RAM), dynamic RAM (DRAM), synchronous DRAM (SDRAM), static RAM (SRAM), or other types of storage devices. Memory 1503 may store information including sequences of instructions that are executed by processor 1501, or any other device. For example, executable code and/or data of a variety of operating systems, device drivers, firmware (e.g., input output basic system or BIOS), and/or applications can be loaded in memory 1503 and executed by processor 1501. An operating system can be any kind of operating systems, such as, for example, Robot Operating System (ROS), Windows® operating system from Microsoft®, Mac OS®/iOS® from Apple, Android® from Google®, LINUX, UNIX, or other real-time or embedded operating systems.

System 1500 may further include IO devices such as devices 1505-1508, including network interface device(s) 1505, optional input device(s) 1506, and other optional IO device(s) 1507. Network interface device 1505 may include a wireless transceiver and/or a network interface card (NIC). The wireless transceiver may be a WiFi transceiver, an infrared transceiver, a Bluetooth transceiver, a WiMax transceiver, a wireless cellular telephony transceiver, a satellite transceiver (e.g., a global positioning system (GPS) transceiver), or other radio frequency (RF) transceivers, or a combination thereof. The NIC may be an Ethernet card.

Input device(s) 1506 may include a mouse, a touch pad, a touch sensitive screen (which may be integrated with display device 1504), a pointer device such as a stylus, and/or a keyboard (e.g., physical keyboard or a virtual keyboard displayed as part of a touch sensitive screen). For example, input device 1506 may include a touch screen controller coupled to a touch screen. The touch screen and touch screen controller can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen.

IO devices 1507 may include an audio device. An audio device may include a speaker and/or a microphone to facilitate voice-enabled functions, such as voice recognition, voice replication, digital recording, and/or telephony functions. Other IO devices 1507 may further include universal serial bus (USB) port(s), parallel port(s), serial port(s), a printer, a network interface, a bus bridge (e.g., a PCI-PCI bridge), sensor(s) (e.g., a motion sensor such as an accelerometer, gyroscope, a magnetometer, a light sensor, compass, a proximity sensor, etc.), or a combination thereof. Devices 1507 may further include an imaging processing subsystem (e.g., a camera), which may include an optical sensor, such as a charged coupled device (CCD) or a complementary metal-oxide semiconductor (CMOS) optical sensor, utilized to facilitate camera functions, such as recording photographs and video clips. Certain sensors may be coupled to interconnect 1510 via a sensor hub (not shown), while other devices such as a keyboard or thermal sensor may be controlled by an embedded controller (not shown), dependent upon the specific configuration or design of system 1500.

To provide for persistent storage of information such as data, applications, one or more operating systems and so forth, a mass storage (not shown) may also couple to processor 1501. In various embodiments, to enable a thinner and lighter system design as well as to improve system responsiveness, this mass storage may be implemented via a solid state device (SSD). However in other embodiments, the mass storage may primarily be implemented using a hard disk drive (HDD) with a smaller amount of SSD storage to act as a SSD cache to enable non-volatile storage of context state and other such information during power down events so that a fast power up can occur on re-initiation of system activities. Also a flash device may be coupled to processor 1501, e.g., via a serial peripheral interface (SPI). This flash device may provide for non-volatile storage of system software, including BIOS as well as other firmware of the system.

Storage device 1508 may include computer-accessible storage medium 1509 (also known as a machine-readable storage medium or a computer-readable medium) on which is stored one or more sets of instructions or software (e.g., module, unit, and/or logic 1528) embodying any one or more of the methodologies or functions described herein. Processing module/unit/logic 1528 may represent any of the components described above, such as, for example, planning module 305, control module 306, and lane changing shifting correction module 308. Processing module/unit/logic 1528 may also reside, completely or at least partially, within memory 1503 and/or within processor 1501 during execution thereof by data processing system 1500, memory 1503 and processor 1501 also constituting machine-accessible storage media. Processing module/unit/logic 1528 may further be transmitted or received over a network via network interface device 1505.

Computer-readable storage medium 1509 may also be used to store the some software functionalities described above persistently. While computer-readable storage medium 1509 is shown in an exemplary embodiment to be a single medium, the term "computer-readable storage medium" should be taken to include a single medium or multiple media (e.g., a centralized or distributed database, and/or associated caches and servers) that store the one or more sets of instructions. The terms "computer-readable storage medium" shall also be taken to include any medium that is capable of storing or encoding a set of instructions for execution by the machine and that cause the machine to perform any one or more of the methodologies of the present disclosure. The term "computer-readable storage medium" shall accordingly be taken to include, but not be limited to, solid-state memories, and optical and magnetic media, or any other non-transitory machine-readable medium.

Processing module/unit/logic 1528, components and other features described herein can be implemented as discrete hardware components or integrated in the functionality of hardware components such as ASICS, FPGAs, DSPs or similar devices. In addition, processing module/unit/logic 1528 can be implemented as firmware or functional circuitry within hardware devices. Further, processing module/unit/logic 1528 can be implemented in any combination hardware devices and software components.

Note that while system 1500 is illustrated with various components of a data processing system, it is not intended to represent any particular architecture or manner of interconnecting the components; as such details are not germane to embodiments of the present disclosure. It will also be appreciated that network computers, handheld computers, mobile phones, servers, and/or other data processing systems which have fewer components or perhaps more components may also be used with embodiments of the disclosure.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the disclosure also relate to an apparatus for performing the operations herein. Such a computer program is stored in a non-transitory computer readable medium. A machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments of the present disclosure are not described with reference to any particular programming language. It will be appreciated that a variety of programming languages may be used to implement the teachings of embodiments of the disclosure as described herein.

In the foregoing specification, embodiments of the disclosure have been described with reference to specific exemplary embodiments thereof. It will be evident that various modifications may be made thereto without departing from the broader spirit and scope of the disclosure as set forth in the following claims. The specification and drawings are, accordingly, to be regarded in an illustrative sense rather than a restrictive sense.

What is claimed is:

1. A machine-implemented method for operating an autonomous driving vehicle, the method comprising:
   determining a first reference trajectory for an autonomous driving vehicle (ADV) to change lanes from a source lane to a target lane based on perception data describing a driving environment surrounding the ADV;
   determining time (T) expected to complete lane changing from the source lane to the target lane;
   calculating a shifting ratio based on the time expected to complete the lane changing;
   calculating a lane shifting correction based on the shifting ratio, a lane configuration of the source lane, the time expected to perform the lane changing, and a current state of the ADV, the lane configuration being determined based on the perception data;
   shifting the entire first reference trajectory including at least a first starting point of the first reference trajectory laterally from a current location of the ADV based on the lane shifting correction to generate a second reference trajectory comprising a second starting point, wherein the first starting point corresponds to the current state of the ADV and the second starting point is different from the first starting point; and
   controlling the ADV according to the second reference trajectory to change lanes from the source lane to the target lane, wherein controlling the ADV comprises:
      determining that a drifting error of the ADV has occurred based on a lateral difference between the current location of the ADV and the second starting point of the second reference trajectory.

2. The method of claim 1, wherein performing a lane shifting correction operation comprises:
   generating a steering control command to modify a heading direction of the ADV based on the drifting error.

3. The method of claim 2, wherein the steering control command is configured to change the heading direction of the ADV towards the second starting point of the second reference trajectory.

4. The method of claim 2, wherein calculating the lane shifting correction based on the lane configuration of the source lane and the current state of the ADV comprises:
 determining a lane width (X) of the source lane based on the lane configuration;
 determining a current speed (V) of the ADV based on the current state of the ADV; and
 calculating a shifting ratio based on the lane width of the source lane and the current speed of the ADV, wherein the lane shifting correction is calculated based on the shifting ratio.

5. The method of claim 4, wherein generating the first reference trajectory is performed for each of a plurality of planning cycles configured based on a predetermined planning frequency (A), and wherein the lane shifting correction is calculated further based on the predetermined planning frequency.

6. The method of claim 5, wherein the lane shifting correction (S) is calculated based on following formula: $S=X*(1/A)/(T*V)$.

7. A non-transitory machine-readable medium having instructions stored therein, which when executed by a processor, cause the processor to perform operations of operating an autonomous driving vehicle, the operations comprising:
 determining a first reference trajectory for an autonomous driving vehicle (ADV) to change lanes from a source lane to a target lane based on perception data describing a driving environment surrounding the ADV;
 determining time (T) expected to complete lane changing from the source lane to the target lane;
 calculating a shifting ratio based on the time expected to complete the lane changing;
 calculating a lane shifting correction based on the shifting ratio, a lane configuration of the source lane, the time expected to perform the lane changing, and a current state of the ADV, the lane configuration being determined based on the perception data;
 shifting the entire first reference trajectory including at least a first starting point of the first reference trajectory laterally from a current location of the ADV based on the lane shifting correction to generate a second reference trajectory comprising a second starting point, wherein the first starting point corresponds to the current state of the ADV and the second starting point is different from the first starting point; and
 controlling the ADV according to the second reference trajectory to change lanes from the source lane to the target lane, wherein controlling the ADV comprises:
  determining that a drifting error of the ADV has occurred based on a lateral difference between the current location of the ADV and the second starting point of the second reference trajectory.

8. The machine-readable medium of claim 7, wherein performing a lane shifting correction operation comprises:
 generating a steering control command to modify a heading direction of the ADV based on the drifting error.

9. The machine-readable medium of claim 8, wherein the steering control command is configured to change the heading direction of the ADV towards the second starting point of the second reference trajectory.

10. The machine-readable medium of claim 8, wherein calculating the lane shifting correction based on the lane configuration of the source lane and the current state of the ADV comprises:
 determining a lane width (X) of the source lane based on the lane configuration;
 determining a current speed (V) of the ADV based on the current state of the ADV; and
 calculating a shifting ratio based on the lane width of the source lane and the current speed of the ADV, wherein the lane shifting correction is calculated based on the shifting ratio.

11. The machine-readable medium of claim 10, wherein generating the first reference trajectory is performed for each of a plurality of planning cycles configured based on a predetermined planning frequency (A), and wherein the lane shifting correction is calculated further based on the predetermined planning frequency.

12. The machine-readable medium of claim 11, wherein the lane shifting correction (S) is calculated based on following formula: $S=X*(1/A)/(T*V)$.

13. The machine-readable medium of claim 7, wherein calculating the lane shifting correction comprises:
 determining to reduce the time expected to perform the lane changing; and
 calculating the lane shifting correction to move the first reference trajectory toward the target lane based on the reduced expected time to perform the lane changing.

14. The machine-readable medium of claim 7, wherein calculating the lane shifting correction comprises:
 determining to increase the time expected to perform the lane changing; and
 calculating the lane shifting correction to move the first reference trajectory away from the target lane based on the increased expected time to perform the lane changing.

15. A data processing system, comprising:
 a processor; and
 a memory coupled to the processor to store instructions, which when executed by the processor, cause the processor to perform operations, the operations including
  determining a first reference trajectory for an autonomous driving vehicle (ADV) to change lanes from a source lane to a target lane based on perception data describing a driving environment surrounding the ADV,
  determining time (T) expected to complete lane changing from the source lane to the target lane,
  calculating a shifting ratio based on the time expected to complete the lane changing,
  calculating a lane shifting correction based on the shifting ratio, a lane configuration of the source lane, the time expected to perform the lane changing, and a current state of the ADV, the lane configuration being determined based on the perception data,
  shifting the entire first reference trajectory including at least a first starting point of the first reference trajectory laterally from a current location of the ADV based on the lane shifting correction to generate a second reference trajectory comprising a second starting point, wherein the first starting point corresponds to the current state of the ADV and the second starting point is different from the first starting point, and
  controlling the ADV according to the second reference trajectory to change lanes from the source lane to the target lane, wherein controlling the ADV comprises:
   determining that a drifting error of the ADV has occurred based on a lateral difference between the current location of the ADV and the second starting point of the second reference trajectory.

16. The system of claim 15, wherein performing a lane shifting correction operation comprises:
   generating a steering control command to modify a heading direction of the ADV based on the drifting error.

17. The system of claim 16, wherein the steering control command is configured to change the heading direction of the ADV towards the second starting point of the second reference trajectory.

18. The system of claim 15, wherein calculating the lane shifting correction comprises:
   determining to reduce the time expected to perform the lane changing; and
   calculating the lane shifting correction to move the first reference trajectory toward the target lane based on the reduced expected time to perform the lane changing.

19. The system of claim 15, wherein calculating the lane shifting correction comprises:
   determining to increase the time expected to perform the lane changing; and
   calculating the lane shifting correction to move the first reference trajectory away from the target lane based on the increased expected time to perform the lane changing.

* * * * *